Sept. 16, 1958 P. S. STALLINGS, JR., ET AL 2,852,582
TREATMENT OF METAL HALIDE SLUDGES
Filed Nov. 10, 1955 2 Sheets-Sheet 2

FIG. 2.

INVENTORS
P. S. STALLINGS, JR
J. W. CLARK
BY
ATTORNEYS

2,852,582

TREATMENT OF METAL HALIDE SLUDGES

Percy S. Stallings, Jr., and Joseph W. Clark, Borger, Tex., assignors to Phillips Petroleum Company, a corporation of Delaware Application November 10, 1955, Serial No. 546,127

22 Claims. (Cl. 260—683.53)

This invention relates to the treatment of metal halide sludges to recover valuable components thereof. In one aspect this invention relates to the production of hydrogen halides. In another aspect this invention relates to the disposal of metal halide sludges formed during the catalytic conversion of hydrocarbons in the presence of metal halide catalysts. In still another aspect this invention relates to apparatus for the treatment of metal halide sludges.

Of great commercial interest at the present time are the isomerization and alkylation of low-boiling hydrocarbons, particularly members of the paraffin series such as the butanes, pentanes, and hexanes. The isomerization of methylcyclopentane to cyclohexane is also of commercial interest. In these reactions, a simple chemical change is effected under relatively mild conditions. In the case of isomerization, a change in carbon skeleton without change in number of carbon atoms occurs, and in the case of alkylation, the direct union of two molecules, such as an isoparaffin and an olefin, occurs to produce a higher molecular weight hydrocarbon. These reactions are known to be catalyzed to a greater or less extent by the so-called Friedel-Crafts type metal halide catalysts, among the better known of which may be mentioned aluminum chloride, aluminum bromide, boron fluoride, zinc chloride, ferric chloride, antimony trifluoride, zirconium tetrachloride, and other polyvalent metal halides, generally used in anhydrous form. Of these catalysts, aluminum chloride has to date received the greatest commercial acceptance due to its activity, relatively low cost, and availability. Such metal halide catalysts are also utilized to a great extent in a relatively large number of other reactions involving hydrocarbons and other organic materials, and such uses are now well known in the art.

In most cases, the metal halide catalysts, as exemplified by aluminum chloride, are advantageously, and sometimes necessarily, activated with the corresponding anhydrous hydrogen halide or with other materials which provide the hydrogen halide under conditions of reaction. The quantity of hydrogen halide required varies greatly in accordance with the reaction being catalyzed and may range from less than one percent of the metal halide up to much larger quantities, such as 50 to 100 percent. The hydrogen halides, being normally gaseous or highly volatile liquids, frequently are lost from the reaction system by leaks or by incorporation in various effluent streams, as well as by reacting with components of the reaction mixture, and such losses in many cases represent a substantial proportion of the chemical cost in a commercial plant.

In organic reactions utilizing anhydrous aluminum chloride or the like, the aluminum chloride can be charged to the process either as a solid, or as a slurry formed by dissolving and/or suspending a considerable amount of aluminum chloride in hydrocarbons or other suitable liquids. In any case a liquid sludge is formed after a short period of operation, the rate usually being more rapid when the reactants are in liquid phase, and the sludge, which at the outset is active as a catalyst, gradually becomes deactivated with use. Such sludges may comprise complexes of aluminum chloride with hydrocarbons or other organic materials, as well as dissolved or suspended free aluminum chloride. In a process in which a sludge forming catalyst is utilized a portion of the sludge must be periodically or continuously withdrawn and replaced with fresh aluminum chloride in order to maintain an economic level of catalytic acitvity. The utilization of such sludge to avoid wasting its aluminum chloride content would be of appreciable economic advantage and would also simplify the problems of sludge disposal. However, in spite of the obvious need for recovering such aluminum chloride, it has heretofore been customary to discard the sludge as waste material. Although a number of processes have been proposed for utilizing partially spent catalyst to effect further reactions or to recover valuable components, various drawbacks have prevented such processes from being brought into commercially active use.

We have found that the sludge formed in hydrocarbon conversion processes catalyzed by metal halide hydrocarbon complex catalysts can be treated to recover valuable components thereof by first partially hydrolyzing said sludge with finely divided water or steam under carefully controlled conditions to obtain a finely divided, free-flowing solid residue, and then treating said solid residue with additional water to complete the hydrolysis. Thus, broadly speaking, our invention comprises first partially hydrolyzing said sludge with a limited amount of finely divided water or steam and then completing the hydrolysis of the said sludge by treatment with water. By so carrying out the hydrolysis of said sludge, under carefully controlled conditions, the above-described difficulties of the prior art can be avoided.

It is an object of this invention to recover valuable components from metal halide sludges. A further object is to treat liquid sludges comprising Friedel-Crafts type metal halides in free and/or combined form in a simple but effective manner in order to recover the halogen content thereof. An additional object is to carry out organic conversions, and particularly hydrocarbon isomerizations and alkylations, in the presence of an aluminum halide catalyst, and to treat sludges derived therefrom to provide make-up hydrogen halide activator for said catalyst. Another object of the invention is to recover organic constituents from sludges of the type described in the form of useful products. Another object of this invention is to manufacture substantially pure hydrogen chloride. Another object of this invention is to provide a two stage process for completely hydrolyzing a metal halide sludge. Still another object is to provide apparatus for the complete hydrolysis of a metal halide sludge. Other objects, aspects, and advantages of the invention will be apparent, to one skilled in the art, from the accompanying disclosure and description.

Thus, according to the invention, there is provided a process for treating a Friedel-Crafts type metal halide sludge formed during the catalytic conversion of a hydrocarbon in the presence of a Friedel-Crafts type metal halide catalyst which comprises: first contacting said sludge in finely divided form in a first portion of a treating zone with a hydrolyzing agent in an amount sufficient to effect only a partial hydrolysis of the metal halide in said sludge to produce hydrogen halide and a finely divided, free-flowing, solid residue; then contacting said residue in a second portion of said treating zone with water in an amount sufficient to substantially complete the hydrolysis of the metal halide in said residue; and recovering products of said hydrolysis from said treating zone. Products which can be recovered include a substantially anhydrous hydrogen halide which is recovered from the vaporous overhead products from said treating zone, and dilute muriatic acid and a resin oil which are recovered from the bottom of said treating zone.

Also, according to the invention, there is provided a reaction chamber, suitable for carrying out the hydrolysis of metal halide sludge in accordance with the method of the invention, which reaction chamber comprises, in combination: a vertical substantially cylindrical reaction chamber; a plurality of inlet conduits extending into said chamber, each of said conduits terminating in a spray nozzle; a first outlet conduit extending from the upper portion of said chamber; a second outlet conduit extending from the bottom of said chamber; valves in each of the aforesaid inlet and outlet conduits; and liquid level control means positioned on said second outlet conduit and operatively connected to the valve in said second outlet conduit.

In a presently preferred embodiment of the invention, the vaporous products of the hydrolysis reactions which are carried out in said first and second sections of said treating zone are passed into an upper portion of said treating zone wherein they are contacted countercurrently with a second stream of finely divided sludge. Said second stream of finely divided sludge reacts with the small amount of water contained in said vaporous products and serves to further dehydrate the hydrogen halide and render same more nearly anhydrous than it would otherwise be. This embodiment of the invention is preferred when it is desired to recover an anhydrous hydrogen halide which is suitable for most uses without further drying treatment. When the water content of the hydrogen halide recovered from the overhead vaporous products is not particularly critical or when it is desired to recover said hydrogen halide in aqueous form, the step of contacting said overhead vaporous products in the upper portion of the treating zone with a second stream of finely divided sludge is not employed.

It is to be noted that only a partial hydrolysis of the metal halide contained in the sludge and/or catalyst is effected in the first stage of our process. Our invention involves carrying out the first stage hydrolysis under carefully controlled conditions so as to effect a degree of hydrolysis up to about 60-70 percent. It is preferred to carry out the first stage hydrolysis reaction so that about 25 to 70 percent of the metal halide content of said sludge is hydrolyzed. For economic reasons, it is more preferable to operate within the higher portion of said range, i. e., from about 50 to 70 percent hydrolysis. A finely-divided, free-flowing, solid residue of partially hydrolyzed sludge is obtained from said first stage hydrolysis. Said solid residue falls into a lower portion of the reaction vessel where it is contacted with water and the hydrolysis is substantially completed.

An important advantage of the invention is that a substantially dry hydrogen halide can be recovered from the vaporous overhead products of the hydrolysis reaction. When only sufficient water or steam is used to obtain about 25 to 70 percent hydrolysis in the first stage of the process, the hydrogen halide recovered will contain from about 0.1 to about 2.0 percent by weight water. When excess amounts of water or steam are employed, the excess is removed overhead from the treating zone with the vaporous products of the reaction and an aqueous hydrogen halide is obtained. By thus controlling the degree of hydrolysis in the first stage of the process as set out above the substantially dry hydrogen halide recovered is, in many instances, sufficiently pure to be used as a catalyst activator for metal halide catalyst in hydrocarbon conversion processes. However, in some instances it will be found preferable to pass the hydrogen halide through a contact drier before returning same to the hydrocarbon conversion zone. We have found that by only partially hydrolyzing the sludge in said first stage, the hydrolysis can then be completed in the second stage of the process in the presence of an excess of water, as discussed further hereinafter, without removing excess water overhead from the treating zone.

The process of our invention is applicable for the treatment of any metal halide sludge obtained from a conversion process wherein hydrocarbons are converted in the presence of a metal halide catalyst. Among such processes which are of particular importance today are the various alkylation and isomerization processes employing aluminum chloride as a catalyst. Due to the importance of said alkylation and isomerization processes, and for the sake of convenience, the invention will be further described as applied to said processes.

In a typical isomerization process a dry normal butane is passed at suitable temperatures and pressures over an aluminum chloride catalyst along with hydrogen chloride. As the isomerization reaction proceeds, a liquid aluminum chloride sludge is formed which contains considerable aluminum chloride. Ordinarily this sludge is withdrawn from the reaction chamber and discarded. In the practice of the present invention this sludge is withdrawn from the reaction chamber and passed to a hydrolysis zone wherein a partial hydrolysis is effected and valuable components of said sludge, including hydrogen chloride, are recovered. The recovered hydrogen chloride is recycled to the reaction chamber.

Herein and in the claims, unless otherwise specified, the word "sludge" is employed generically and includes, liquid metal halide-hydrocarbon complex catalyst containing sludge therein such as that employed in alkylation processes, and liquid sludge per se such as that which forms when a solid metal halide catalyst is employed as in some isomerization processes.

Figure 1:
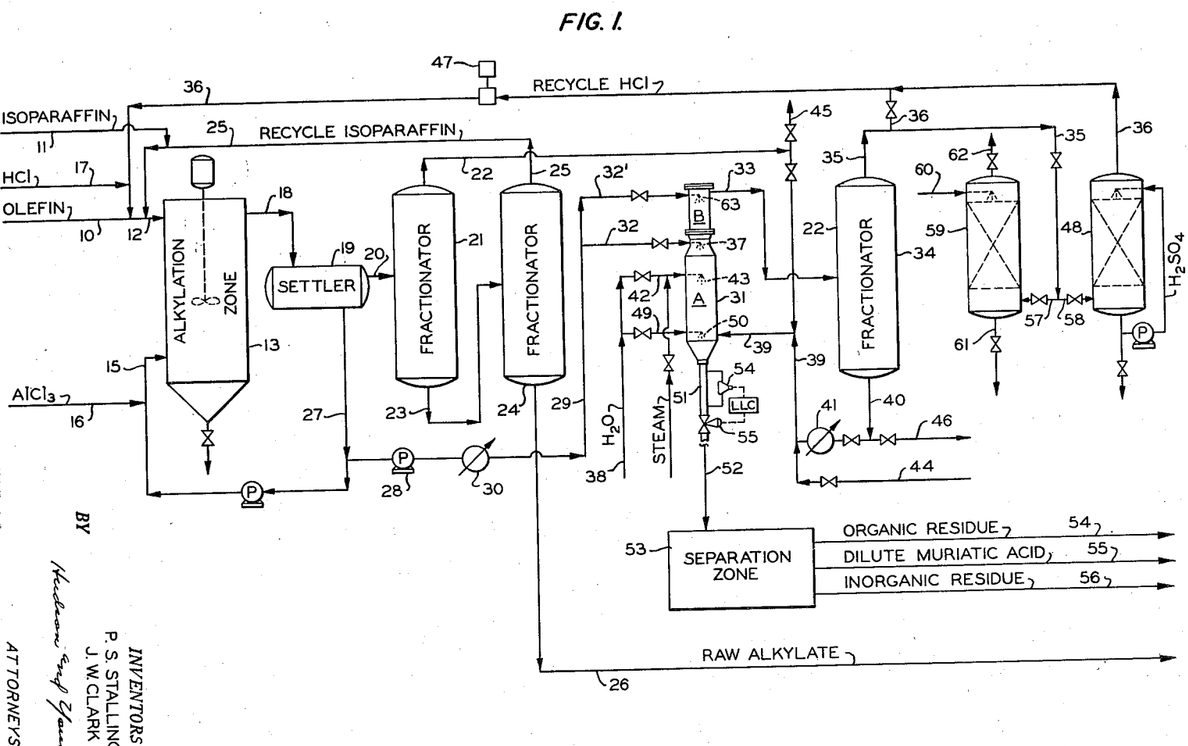
Figure 1 is a diagrammatic flow sheet of an alkylation process wherein the method of our invention is employed. Several embodiments of the invention are illustrated in said Figure 1. Much conventional apparatus such as heat exchangers, valves, pumps, condensers, etc., have been omitted for the sake of simplicity. However, the use of such apparatus is within the scope of the invention.

Referring now to the drawings the invention will be more fully explained as applied to the alkylation of isobutane with ethylene for the production of diisopropyl. In Figure 1 ethylene from line 10 together with isobutane from line 11, in a mol ratio of approximately 4.5 mols of isobutane to 1 mol of ethylene, are charged through line 12 into alkylator 13. A small amount of hydrogen chloride from lines 36 and/or 17 is introduced along with said hydrocarbons. In alkylator 13 said hydrocarbons are intimately contacted with aluminum chloride hydrocarbon complex catalyst which enters said reactor through line 15. The alkylation reaction is conducted at a pressure sufficiently high to maintain all of the hydrocarbon in liquid phase, for example, at about 375 to 450 lbs. per square inch gage. A temperature of about 80 to about 150° F. is employed. The viscosity of said catalyst is usually maintained at about 200 to 350 centipoises at 100° F. The catalyst can be originally prepared by mixing aluminum chloride and kerosene in a weight ratio of about 8 to 5. During operation of the process the original complex catalyst is replaced with complex catalyst formed in the process and which contains aluminum chloride and hydrocarbon in a ratio of about 1 to 1. The viscosity of the catalyst and also the conversion of ethylene depend upon catalyst activity which can be maintained by adding make-up aluminum chloride via line 16. Make-up hydrogen chloride can be added through line 17. With an active catalyst, conversion of ethylene can be maintained within the desired range of 90 to 99 percent, preferably 97 to 99 percent. A catalyst ratio of about 1 volume of catalyst per 1.5 to 2 volumes of hydrocarbon is usually employed.

Reaction mixture comprising unreacted hydrocarbons, alkylate, and catalyst phase is withdrawn from reactor 13 through line 18 and passed into settler 19 wherein a separation is effected between the hydrocarbon phase and the catalyst phase. Said hydrocarbon phase is removed via line 20 and introduced into fractionator 21 wherein propane and lighter materials are removed overhead via line 22 for further use as described hereinafter. If desired, said propane and lighter materials can be withdrawn through line 45. Bottoms product from fractionator 21 is withdrawn and passed via line 23 into fractionator 24 wherein unreacted isobutane is removed overhead and recycled via line 25 to the reaction zone. Raw alkylate is withdrawn from the bottom of fractionator 24 and passed via line 26 to further treatment and/or purification as desired.

The bottom layer in settler 19 comprises the aluminum chloride hydrocarbon complex catalyst which contains the sludge which has formed during the conversion reaction. Said bottom layer is withdrawn through line 27 and the greater portion thereof is recycled to the reaction zone. As mentioned, during the reaction in alkylator 13 the volume of the catalyst phase increases due to the formation of sludge. Therefore, it is necessary to withdraw a portion of said catalyst phase, intermittently or continuously, preferably continuously, so as to maintain the volume of the catalyst phase substantially constant. Fresh aluminum chloride is added to the circulating stream of catalyst so as to keep the activity of said catalyst at a suitably high level and to maintain the aluminum chloride content at about 50 to 70 percent by weight. Prior to our invention the withdrawn portion of the catalyst phase was usually discarded. In the practice of our invention said withdrawn portion is passed via pump 28 through heater 30, line 29, and introduced via conduit 32 into hydrolysis tower 31.

In hydrolysis tower 31 said sludge introduced via conduit 32 is sprayed, in finely divided condition, preferably downwardly, by means of spray nozzle means 37. Said spray nozzle means should preferably have an angle of spray such that the particles of finely divided sludge do not impinge the wall of hydrolysis tower 31 before partial hydrolysis is complete and solid particles are formed so as to prevent the liquid sludge from adhering to said wall. Water or steam is introduced via conduits 38 and 42 into hydrolysis tower 31 wherein, if water is used, said water is sprayed, in finely divided form, preferably downwardly, by means of spray nozzle means 43. Said spray nozzle means 43 is positioned below said spray nozzle means 37 and preferably has an angle of spray such that the steam or the particles of finely divided water substantially completely blanket the cross-sectional area and preferably impinge the wall of said hydrolysis tower 31. Finely divided sludge from spray nozzle means 37 is thus sprayed downwardly into the steam or the particles of finely divided water introduced through spray nozzle means 43. Said sludge reacts with said water or steam and liberates substantial quantities of heat. When water is used the heat thus released causes a considerable portion of the water to vaporize and form steam which rises through tower 31 and thus contacts the downwardly sprayed particles of finely divided sludge. By properly controlling the sludge to water ratio, as discussed further hereinafter, particles of a finely divided solid residue are obtained. The above-described combination of steps comprises the first stage of our process.

Said particles of finely divided solid residue fall downwardly through hydrolysis tower 31 and into a second spray of finely divided water introduced via line 49 and spray nozzle means 50. Said spray nozzle means 50 preferably has an angle of spray such that the particles of finely divided water impinge the wall of said tower 31, thus substantially blanketing the cross-sectional area of said tower. Further hydrolysis of the metal halide contained in said finely divided solid takes place when said particles of finely divided solid residue fall into the spray of finely divided water, and when the water is running down the sloping wall of the cone shaped bottom of the reactor. This second stage hydrolysis reaction releases the hydrocarbons and/or resin oils which were retained in the particles of finely divided solid residue from the first stage hydrolysis; and there is also released or there remains a second finely divided solid residue comprising the oxide of the metal originally present in the metal halide catalyst. Said released oils, and water containing dissolved hydrogen halide as well as dissolved and/or suspended finely divided oxide residue flow into water seal leg or withdrawal conduit 51 and are passed via line 52 into separation zone 53. A liquid level is maintained in withdrawal conduit 51 by means of liquid level controller 54 which is operatively connected to a fast acting valve 55. In separation zone 53, a separation between the organic residue, i. e., the resin oils, dilute muriatic acid, and inorganic residue, i. e., the finely divided metal oxide, is effected. Said organic residue, dilute muriatic acid, and inorganic residue are withdrawn as products of the process through lines 54', 55', and 56 respectively.

Vaporous products of the hydrolysis reactions are withdrawn overhead from tower 31 through conduit 33. Said vaporous products which comprise hydrogen chloride, propane and/or butane, and small amounts of water, are introduced into fractionator 34. Substantially anhydrous hydrogen chloride (usually containing not more than 2 percent by weight water) is removed overhead from fractionator 34 via line 35, and recycled via lines 36 and 12 to reaction zone 13. Compressor 47 can be employed to compress the hydrogen chloride to a pressure sufficient for entering line 10 when such compression is necessary or desirable. In some instances it will be desirable to pass said hydrogen chloride into contact drier 48 via line 58 and remove the last traces of water prior to returning the hydrogen chloride to said reaction zone. In contact drier 48 said hydrogen chloride is dried by contacting same with a drying agent such as sulfuric acid, etc. Traces of hydrogen sulfide, etc., are also removed in contact drier 48.

Alternative to passing the hydrogen chloride recovered overhead from fractionator 34 into contact drier 48 said hydrogen chloride can be introduced via lines 35 and 37 into absorber 59. Water is introduced via line 60 into said absorber 59 and therein countercurrently contacts said hydrogen chloride, and absorbs same to form muriatic acid. Said muriatic acid is withdrawn through line 61 to storage or other use as desired. Unabsorbed gases are withdrawn from absorber 59 through line 62.

Still another alternative is to introduce a hydrocarbon such as butane, isobutane, etc. into absorber 59 via line 60 and absorb the hydrogen chloride in said hydrocarbon. The hydrocarbon containing the absorbed hydrogen halide can then be withdrawn via line 61 and introduced by means of a line (not shown) into line 10. Said hydrogen chloride is thus returned to the process wherein it serves as a promoter for the aluminum chloride catalyst. Although the lines are not shown in the accompanying Figure 1 it will be understood by those skilled in the art that if desired the hydrocarbon which is employed in absorber 59 to absorb said hydrogen chloride can be recycle isoparaffin from line 25, fresh isoparaffin from line 11, olefin feed from line 10, propane and lighter gases from line 22, or comparable hydrocarbons introduced from an outside source (not shown) into line 60. The various transfer lines for effecting these alternative operations have been omitted from the drawing for the sake of simplicity since it will be readily apparent to those skilled in the art how such transfers can be effected.

In a presently preferred embodiment of the invention the hydrogen chloride produced in the upper portion of hydrolysis tower 31 is passed into an upper section B of said tower 31 and therein contacted with a second spray of finely divided sludge introduced via conduit 32' and spray nozzle means 63. Said spray nozzle means 63 preferably has an angle of spray such that the particles of finely divided sludge substantially completely blanket the cross-sectional area of portion B of tower 31 without impinging the wall of tower 31. By thus contacting the vaporous products from the lower portion A of tower 31 with a second spray of finely divided sludge, a more anhydrous hydrogen chloride can be recovered from the vaporous products withdrawn through line 33. When the dual sludge spray system just described is employed, it is preferred that the orifice in spray nozzle means 63 be smaller than that in spray nozzle means 37. When this embodiment of the invention is employed a combination sludge and water spray can be employed, i. e., a combination spray means, which ejects a stream of water or steam against an impingement plate which deflects said steam or water into a sprayed cone of said sludge, can be employed at 37.

Figure 2:
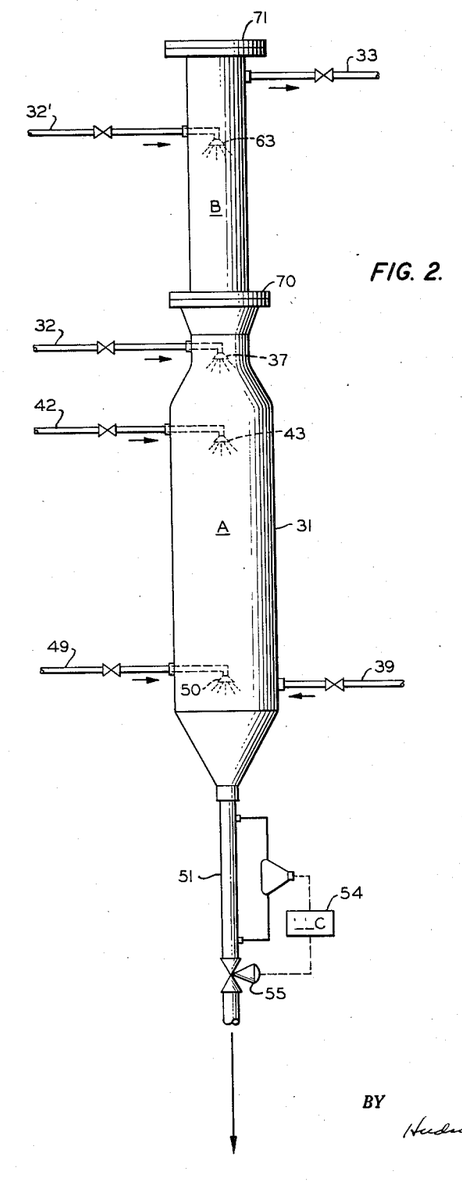
Figure 2 illustrates a presently preferred design of the reaction chamber 31 employed in the processes illustrated in Figure 1.

Figure 2 illustrates a presently preferred reaction chamber or hydrolysis tower. Said hydrolysis tower is designated generally by the reference numeral 31 as in Figure 1. Said tower 31 comprises a vertical, substantially cylindrical vessel having a lower section A and an upper section B. Said upper section B is removably attached to said lower section A by means of suitable flanges or other means 70. Closure means 71, usually comprising suitable flanges, is employed to close the upper end of said section B. A first conduit outlet 33 extends from the upper portion of said section B. A first inlet conduit 32' extends into the interior of section B and terminates in a spray nozzle means 63. It will be noted that the upper portion of said section A has the shape of a venturi, and the lower portion of said section A has a shape of an inverted truncated cone. A second inlet conduit 32 extends into the interior of the upper portion of said section A at about the throat of said venturi and terminates in a spray nozzle means 37. Said spray nozzle means 37 preferably has an angle of spray such that materials sprayed therethrough do not impinge the wall of vessel 31 so as to prevent possible deposition of sludge on said wall. A third inlet conduit means 42 extends into an intermediate portion of the said section A and terminates in a third spray nozzle means 43, which preferably has an angle of spray such that the cross-sectional area of said section A is substantially completely blanketed by material injected through said spray nozzle means 43; and said sprayed material does preferably impinge the wall of vessel 31 so as to provide a washing action for any other materials which might adhere to said wall. A fourth inlet conduit 49 extends into an intermediate portion of said section A and terminates in a fourth spray nozzle means 50 having an angle of spray such that material injected therethrough impinges the wall of vessel 31. In a preferred form of the apparatus the spray angle of said fourth spray nozzle means 50 is such that materials sprayed therethrough impinge the wall of said inverted truncated cone of vessel 31. Water or other materials which thus impinge the wall of said vessel provide a washing action for said wall removing any particles of sludge or solids which might tend to adhere thereto. A fifth inlet conduit 39 extends into an intermediate portion of said lower section A. Each of said inlet conduits or outlet conduits can have suitable valves positioned therein. Attached to the bottom of said inverted truncated cone is a second withdrawal conduit means or liquid seal leg 51. Attached to the wall of said second withdrawal conduit means is a liquid level controller 54 which is operatively connected to valve 55. It is to be noted that the liquid level is maintained in liquid seal leg 51 rather than in the bottom of the tower itself. If the liquid level is maintained in the tower a layer of oil blankets the surface of the water. The finely divided partially hydrolyzed sludge from the first stage tends to float on said oil, thus greatly reducing the efficiency of the second stage of the process. Liquid level control means 54 can comprise any suitable type of liquid level control means suitable for maintaining a liquid level in said second outlet conduit means 51. A preferred type of that commonly known in the art as a Magnetrol. Valve 55 should preferably be a fast-acting valve. A presently preferred valve is a fast-acting gate valve which substantially completely opens or substantially completely closes responsive to each impulse from liquid level control means 54.

Hydrolysis tower 31 should be constructed of corrosion resistant materials because of the corrosive nature of the sludge being treated and the corrosive nature of the hydrogen halide in the presence of water. Special linings of glass, ceramic, or plastic, all available commercially, can be employed.

In both Figures 1 and 2, the various spray nozzle means have been illustrated as comprising a single spray nozzle. It should be understood that said spray nozzle means can comprise a plurality of spray nozzles when necessary or desired.

Thermocouple wells (not shown) can be provided for determining temperatures within the tower at various points.

It is of course well known that aluminum chloride can be hydrolyzed with water to form hydrogen chloride and aluminum oxide. The exact nature of the physical changes, as opposed to the said chemical changes, which occur in the sludge being treated according to our invention is presently unknown. When aluminum chloride sludges are mixed with liquid water, there is formed a heavy, tarry residue which fouls lines, pumps, and other equipment, and in some instances, even sets to a solid in such equipment. In some instances when such sludges are contacted with liquid water, excessive foaming takes place with the formation of an emulsion which is very difficult to break. It is presently believed that the successful operation of the process of our invention, whereby said sludges can be substantially completely hydrolyzed, is due primarily to (1) the introduction of the sludge in a finely divided condition and (2) the introduction of said finely divided sludge into finely divided water such as a fog or mist, or steam, to produce a finely-divided, free-flowing solid in the first stage of the process, which solid can then be contacted with water in the second stage of the process to complete the hydrolysis.

Steam is usually used as the hydrolyzing agent in the first stage of our process when said process is carried out at low pressures, i. e., atmospheric pressure or substantially atmospheric pressures in the range of 0 to 50 p. s. i. g. Water is usually used at higher pressures. The amount of water or steam used in the first stage of our process is an amount sufficient to effect only a partial hydrolysis, i. e., up to about 70 weight percent of the metal halide contained in the sludge. The minimum amount of water used in the second stage of our process is the amount necessary to complete the hydrolysis of said metal halide. Actually an excess of water is employed in the second stage in actual operation, the excess serving as a washing medium which serves to move the metal oxide residue from the hydrolysis tower.

The amount of water injected into the first stage of the process must be carefully controlled so as to obtain the dry, free-flowing, finely-divided residue which falls downwardly through the tower and is contacted in the second stage. We have found that the amount of water or steam injected into the first stage of our process (as through nozzle 43 in Figure 1) can range from about 0.05 to about 0.25 pound of water per pound of sludge. Stated another way, the sludge to water ratio in the first stage is in the range of 4 to 20 pounds of sludge per pound of water. If the sludge to water (or steam) ratio in the first stage is too low the hydrogen halide product recovered from the vaporous overhead products will be wet due to the excess water vapor being carried overhead. If the sludge to water (or steam) ratio is too high insufficient hydrolysis will result and the bottom product will be viscous.

We have found that the amount of water used in the second stage of our process can range from 0.25 to 1 pound of water per pound of sludge. Stated another way, the sludge to water ratio in the second stage can range from about 1 to 4 pounds of sludge per pound of water. Some of the water introduced into the second stage will be vaporized and rise through the tower to contact the sludge in the first stage zone of the tower. This fact should be taken into consideration when setting the amount of water to be injected into the first stage of the process. If too great an excess of water is employed in the second stage the amount of hydrogen halide absorbed and removed from the bottom of the tower in aqueous solution will be excessive. Thus, it is preferable that the excess water (over that necessary to complete the hydrolysis) used in the second stage be only sufficient to adequately wash the metal oxide residue from the tower. It is preferred to so adjust the amounts of water injected into the first and second stages that the overall sludge to water ratio will be in the range of 1 to 3 pounds of sludge per pound of water.

When employing our dual sludge spraying method in the presently preferred embodiment of the invention, i. e., as when injecting a portion of the sludge through spray nozzle means 37, and another portion through spray nozzle means 63, the total amount of sludge introduced is usually divided so that approximately one-fourth to one-half the sludge is injected through the upper spray nozzle, i. e., spray nozzle 63. However, the injected sludge can be otherwise divided if desired.

The temperature at which the sludge is introduced into hydrolysis tower 31 will depend upon the nature of the sludge being treated, the spraying characteristics of said sludge, and the type of spraying equipment employed. It is preferred to heat the sludge to a temperature within the range of about 225 to about 400° F. When steam is employed as the hydrolyzing medium it is usually introduced at a temperature within the range of 225 to 325° F. When water is employed as the hydrolyzing medium it is introduced as a finely divided mist or fog employing any of the several well known fog nozzles which are available commercially. It is not necessary to preheat the water. It should be realized that the temperature at which the sludge is introduced is not necessarily the temperature at which the hydrolysis reaction is carried out. Said hydrolysis reaction is highly exothermic and temperatures in the zone wherein the reaction is actually taking place may approach 600° F. or even higher, particularly when steam is used in the first stage of the process.

Pressure is not a limitation upon the process of our invention. The process can be carried out at atmospheric or substantially atmospheric pressures i. e., pressures within the range 0 to 50 p. s. i. g. The process can also be carried out at reasonably higher pressures such as up to about 600 p. s. i. g. by employing suitable pressure equipment. At the higher pressures the corrosive nature of the sludges being treated and of the products obtained therefrom cause complications in the selection of suitable construction materials for the apparatus.

An additional feature of the invention which aids in controlling the amount of corrosion which occurs in hydrolysis tower 31 is to recycle a portion of the resin oil which is recovered through line 54 of Figure 1. Said resin oil can be introduced by means of a line (not shown) into line 44 and thus introduced into said tower via inlet conduit 39 wherein it will blanket the wall of the inverted truncated cone portion, which portion of said tower 31 is the most susceptible to corrosion. If desired said resin oil can be introduced into said tower at points farther up the tower so as to blanket and thus protect substantially all the internal wall of said tower.

Another additional feature of the invention which aids in controlling the amount of corrosion which occurs in hydrolysis tower 31 is to introduce a light hydrocarbon, such as a $C_3$ or $C_4$ hydrocarbon into said tower via inlet conduit 39. Upon introduction into the tower said hydrocarbon immediately vaporizes and reduces the partial pressure of the hydrogen halide present, which in turn reduces the amount of hydrogen halide absorbed in the liquid water present. Thus, the introduction of said light hydrocarbon not only aids in reducing the amount of corrosion but also results in increased recovery of vaporous hydrogen halide which is generally desirable.

Said light hydrocarbon introduced into tower 31 can come from any convenient source, such as an outside source via lines 44 and 39, from the overhead stream from fractionator 21 via lines 22 and 39, or the bottoms product from fractionator 34 via lines 40 and 39. The amount of said light hydrocarbon to be thus introduced into tower 31 will depend upon the amount of sludge being treated, size of the tower, operating conditions, etc., as will be understood by those skilled in the art, and can be readily determined by routine test.

The following example will serve to further illustrate the invention.

EXAMPLE

A spent aluminum chloride sludge from the alkylation of isobutane with ethylene as described above, containing approximately 58.5 weight percent aluminum chloride complexed with approximately 41.5 weight percent of hydrocarbons was heated to 227° F. and sprayed downwardly at a rate of 125 pounds per hour into the hydrolysis tower of Figure 2. The spraying pressure was 300 p. s. i. g. Said sludge was divided with approximately one-third being injected through spray nozzle 63 and two-thirds through spray nozzle 37. Said spray nozzle 63 had an orifice diameter of 15 microns and said spray nozzle 37 had an orifice diameter of 20 microns. Both of said spray nozzles were purchased from the Bete Fog Nozzle Company of Greenfield, Massachusetts; spray nozzle 63 being designated as nozzle number P15 and spray nozzle 37 being designated as nozzle number P20 by said company.

Water for the first stage of the process (partial hydrolysis) was introduced through spray nozzle 43 at a rate of 18 pounds per hour. Water for the second stage of the process was introduced through spray nozzle 50 at a rate of 70.8 pounds per hour. Vaporous products of the reaction were removed overhead from said tower via conduit 33. Bottoms product comprising water (dilute muriatic acid), organic residue (resin oil), and inorganic residue (finely divided aluminum oxide) was removed via outlet conduit 51.

Table I given below summarizes operating conditions and yields obtained in the above run. Also summarized in Table I are the results of a second run carried out in the same equipment under substantially the same conditions.

Table I.—*Summary of data and results from complete hydrolysis of spent aluminum chloride sludge containing catalyst*

|  | Run No. 1 | Run No. 2 |
|---|---|---|
| Sludge Rate, lbs./hr. | 125 | 130 |
| Sludge Spray Pressure, p. s. i. g. | 230 | 300 |
| Sludge Preheat Temp., ° F. | 227 | 225 |
| Water Spray Rate, lbs./hr.: | | |
| Middle (Nozzle 43) | 18 | 15 |
| Bottom (Nozzle 50) | 70.8 | 70.8 |
| Sludge/Water Wt. Ratio: | | |
| Middle Spray | 6.95 | 8.66 |
| Total | 1.41 | 1.51 |
| Water/Sludge Wt. Ratio: | | |
| Middle Spray | 0.14 | 0.12 |
| Total | 0.71 | 0.66 |
| Tower Temperatures, ° F.: | | |
| Vapor Effluent | 225 | 210 |
| Top | 248 | 257 |
| Middle | 225 | 230 |
| Bottom | 260 | 257 |
| Sludge Composition, Wt. Percent: | | |
| Hydrocarbons | 6.58 | 6.58 |
| Aluminum Chloride | 58.50 | 58.50 |
| Resin Oil | 34.92 | 34.92 |
|  | 100.00 | 100.00 |
| Yields: | | |
| Effluent Gas ft.³/hr. at 100° F | 62.4 | 54.8 |
| Effluent Gas Composition—Vol. Percent— | | |
| HCl | 81.88 | 84.8 |
| $H_2S$ | 0.02 | |
| $H_2O$ | 0.25 | |
| $H_2$ | 1.73 | |
| $CO_2$ | 0.25 | |
| Air | 1.65 | |
| $C_1$ | 0.25 | |
| $C_2$ | 0.59 | |
| $C_3$ | 0.41 | |
| $C_4+$ | 13.05 | |
|  | 100.08 | |
| HCl Produced lbs./hr. (overhead) | 32.4 | |
| HCl Available, (Theoretical) lbs./hr. | 59.9 | |
| HCl Recovered, Percent of Theoretical | 54.1 | |
| HCl Yield, lbs./lb. sludge | 0.26 | |

As will be evident to those skilled in the art in view of the above disclosure, various modifications of the invention can be made without departing from the spirit or scope of said disclosure.

We claim:

1. A process for treating a Friedel-Crafts type metal halide sludge formed during the catalytic conversion of hydrocarbons in the presence of a Friedel-Crafts type metal halide catalyst which comprises: contacting said sludge in finely divided liquid form in a first portion of a treating zone with a hydrolyzing agent in an amount sufficient to hydrolyze not more than 70 percent by weight of the metal halide in said sludge to produce hydrogen halide and a finely divided, free-flowing, solid residue; contacting said residue in a second portion of said treating zone with water in an amount sufficient to substantially complete hydrolysis of the metal halide in said residue; and recovering substantially anhydrous hydrogen halide from said treating zone, said hydrolyzing agent being selected from the group consisting of finely divided water and steam.

2. The process of claim 1 wherein said hydrolyzing agent is finely divided water.

3. The process of claim 1 wherein said hydrolyzing agent is steam.

4. The process of claim 1 wherein said metal halide catalyst is aluminum chloride and said hydrogen halide is hydrogen chloride.

5. The process of claim 1 wherein the metal halide contained in said sludge is hydrolyzed in said first section of said treating zone to an extent within the range of 25 to 70 percent by weight.

6. The process of claim 1 wherein said metal halide catalyst is aluminum chloride, said hydrogen halide is hydrogen chloride and said hydrolyzing agent is added to said treating zone in an amount within the range of 0.05 to 0.25 pound per hour per pound of sludge charged to said treating zone.

7. A process for treating a Friedel-Crafts type metal halide sludge formed during the catalytic conversion of hydrocarbons in the presence of a Friedel-Crafts type metal halide catalyst which comprises: introducing a first stream of said sludge in finely divided liquid form into an intermediate portion of a treating zone; introducing a stream of a hydrolyzing agent selected from the group consisting of finely divided water and steam into an intermediate portion of said treating zone at a point below the point of introduction of said first stream of sludge, said hydrolyzing agent being present in an amount sufficient to effect only a partial hydrolysis of the metal halide contained in said sludge; introducing a second stream of said sludge in finely divided liquid form into an upper portion of said treating zone at a point above the point of introduction of said first stream of sludge so as to effect intimate countercurrent contact with ascending vaporous products of said hydrolysis reaction; withdrawing said vaporous products from said treating zone; and recovering substantially anhydrous hydrogen halide from said vaporous products.

8. A process for treating a Friedel-Crafts type metal halide sludge formed during the catalytic conversion of hydrocarbons in the presence of a Friedel-Crafts type metal halide catalyst which comprises: contacting said sludge in finely divided liquid form in a first section of a treating zone with a hydrolyzing agent in an amount sufficient to effect only a partial hydrolysis of the metal halide in said sludge to produce hydrogen halide and a finely divided, free-flowing, solid residue; contacting said residue in a second section of said treating zone with water in an amount sufficient to substantially complete hydrolysis of the metal halide in said residue; recovering a substantially anhydrous hydrogen halide from said treating zone, and recovering a resin oil from an effluent from said treating zone; said hydrolyzing agent being selected from the group consisting of water mist and steam.

9. The process of claim 8 wherein at least a portion of said resin oil is returned to said treating zone so as to form a protective coating on at least a portion of the wall of said treating zone.

10. A process for the production of a hydrogen halide which comprises: contacting, in finely divided liquid form, in a first contacting step, a Friedel-Crafts type metal halide organic sludge, spent as a catalyst in an organic reaction, with a hydrolyzing agent selected from the group consisting of steam and finely divided water in an amount sufficient to hydrolyze not more than 70 percent by weight of the metal halide contained in said sludge to produce a first stream of hydrogen halide and a free-flowing, finely divided solid residue; contacting said solid residue in a second contacting step with a stream of water in an amount sufficient to substantially completely hydrolyze the metal halide contained in said solid residue to produce a second stream of hydrogen halide and a liquid residue comprising inorganic material suspended in a mixture of water and organic material; combining said first stream of hydrogen halide and said second stream of hydrogen halide; contacting said combined stream of hydrogen halide with a second stream of said metal halide organic sludge in finely divided liquid form; and recovering a substantially anhydrous hydrogen halide as a product of the process.

11. A process according to claim 10 wherein said metal halide is aluminum chloride, said sludge is formed during a hydrocarbon conversion process, and said sludge is hydrolyzed in said first contacting step to an extent within the range of 25 to 70 percent by weight.

12. In a hydrocarbon conversion process wherein a hydrocarbon feed is contacted with a Friedel-Crafts type metal halide catalyst to effect conversion of said hydrocarbon feed, and wherein said metal halide catalyst forms a sludge during said conversion, the improvement which comprises: withdrawing and passing at least a portion of said metal halide catalyst containing said sludge to a treating zone and herein contacting same in a first section of said treating zone, in finely divided liquid form, with a hydrolyzing agent selected from the group consisting of steam and finely divided water in an amount sufficient to hydrolyze not more than 70 percent by weight of the metal halide in said withdrawn complex catalyst phase to produce hydrogen halide and a finely divided, free-flowing, solid residue; contacting said residue in a second section of said treating zone with water in an amount sufficient to substantially complete hydrolysis of the metal halide in said residue; recovering hydrogen halide so formed from said treating zone; and returning said hydrogen halide to said conversion zone as a promoter for said catalyst therein.

13. The process of claim 12 wherein said hydrogen halide recovered from said treating zone is absorbed in a stream of a light hydrocarbon and said light hydrocarbon containing absorbed hydrogen halide is passed to said conversion zone.

14. In a process for the isomerization of normal butane to produce isobutane wherein normal butane admixed with catalyst-activating amounts of hydrogen chloride is contacted with an aluminum chloride isomerization catalyst in a reaction zone at conditions effecting the formation of isobutane and a liquid aluminum chloride-hydrocarbon sludge, which sludge is withdrawn from said reaction zone, the improvement which comprises passing at least a portion of said withdrawn sludge to a first section of a treating zone and therein contacting same, in finely divided liquid form, with a hydrolyzing agent selected from the group consisting of steam and finely divided water in an amount sufficient to hydrolyze not more than 70 percent by weight of the aluminum chloride in said sludge to produce hydrogen halide and a finely divided, free-flowing, solid residue; contacting said residue in a second section of said treating zone with water in an amount sufficient to substantially complete hydrolysis of the metal halide in said residue; recovering substantially anhydrous hydrogen chloride so formed from said treating zone; and returning said recovered hydrogen chloride to said reaction zone as at least a portion of said hydrogen chloride admixed with said butane.

15. In an alkylation process wherein isobutane and a low-boiling olefin comprising predominantly ethylene are intimately contacted in an alkylation zone with a liquid aluminum chloride-hydrocarbon complex catalyst under conditions effecting alkylation of said isoparaffin with said olefin to give a product comprising predominantly isohexane which is composed predominantly of diisopropyl, the alkylation effluent is separated into a liquid hydrocarbon phase and a liquid aluminum chloride-hydrocarbon complex catalyst phase containing sludge formed during said alkylation, and said complex catalyst phase is recycled to the alkylation zone, the improvement which comprises: withdrawing and passing a portion of said catalyst phase containing said sludge to a first section of a treating zone and therein contacting same, in finely divided liquid form, with a hydrolyzing agent selected from the group consisting of steam and finely divided water in an amount sufficient to hydrolyze not more than 70 percent by weight of the aluminum chloride in said withdrawn portion of complex catalyst phase to produce hydrogen halide and a finely divided, free-flowing, solid residue; contacting said residue in a second section of said treating zone with water in an amount sufficient to substantially complete hydrolysis of the metal halide in said residue; recovering hydrogen halide so formed from said treating zone; and returning said hydrogen halide to said alkylation zone as a promoter for said catalyst therein.

16. A process for treating a Friedel-Crafts type metal halide sludge formed during the catalytic conversion of hydrocarbons in the presence of a Friedel-Crafts type metal halide catalyst which comprises: introducing a first stream of said sludge in finely divided liquid form into an intermediate portion of a treating zone; introducing a stream of a hydrolyzing agent selected from the group consisting of finely divided water and steam into an intermediate portion of said treating zone at a point below the point of introduction of said first stream of sludge so as to effect intimate contact between descending particles of said sludge and particles of said hydrolyzing agent, said hydrolyzing agent being present in an amount sufficient to effect only a partial hydrolysis of the metal halide contained in said sludge; introducing a stream of water in finely divided form into a lower portion of said treating zone so as to effect intimate contact between descending particles of partially hydrolyzed sludge and particles of said finely divided water present in an amount sufficient to effect substantially complete hydrolysis of the remaining metal halide contained in said partially hydrolyzed sludge; introducing a second stream of said sludge in finely divided liquid form into an upper portion of said treating zone above the point of introduction of said first stream of sludge so as to effect intimate countercurrent contact with ascending vaporous products of said hydrolysis reactions; withdrawing vaporous products of said hydrolysis reaction overhead from said treating zone; recovering substantially anhydrous hydrogen halide from said vaporous products; and withdrawing remaining products of said hydrolysis reactions comprising a mixture of organic residue, inorganic residue and aqueous hydrogen halide from the bottom portion of said treating zone.

17. The process of claim 16 wherein a stream of a light hydrocarbon is introduced into the lower portion of said treating zone in an amount sufficient to appreciably lower the effective partial pressure of the hydrogen halide in said treating zone and thereby reduce the amount of said hydrogen halide adsorbed in said water to form aqueous hydrogen halide, said light hydrocarbon, after vaporization, being withdrawn overhead from said treating zone with said vaporous products.

18. In a hydrocarbon conversion process wherein, a hydrocarbon feed is contacted with a Friedel-Crafts type metal halide catalyst in a conversion zone under conditions effecting conversion of said hydrocarbon feed, said catalyst forms a sludge during said conversion, and hydrocarbon effluent from said conversion zone is fractionated to yield a stream comprising $C_3$ hydrocarbons and lighter, the improvement which comprises: spraying a first portion of said sludge in finely divided liquid form into an intermediate portion of a treating zone; introducing a stream of a hydrolyzing agent selected from the group consisting of water mist and steam into an intermediate portion of said treating zone in an amount sufficient to effect only a partial hydrolysis of the metal halide contained in said sludge and intimately contacting descending particles of said sludge therewith; introducing a stream of water in finely divided form into a lower portion of said treating zone and effecting intimate contact between descending particles of partially hydrolyzed sludge and particles of said water in finely divided form present in an amount sufficient to effect substantially complete hydrolysis of the remaining metal halide contained in said partially hydrolyzed sludge; introducing a second stream of said sludge in finely divided form into an upper portion of said treating zone so as to effect intimate countercurrent contact with ascending vaporous products of said hydrolysis reactions; withdrawing vaporous products of said hydrolysis reaction overhead from said treating zone; recovering substantially anhydrous hydrogen halide from said vaporous products; returning said substantially anhydrous hydrogen halide to said conversion zone as an activator for said catalyst; introducing at least a portion of said $C_3$ hydrocarbon and lighter stream into the lower portion of said treating zone in an amount sufficient to appreciably lower the effective partial pressure of the hydrogen halide in said treating zone and thereby reduce the amount of said hydrogen halide absorbed in said water to form aqueous hydrogen halide; withdrawing said introduced $C_3$ hydrocarbons and lighter overhead from said treating zone with said vaporous products; and withdrawing remaining products of said hydrolysis reactions comprising a mixture of organic residue, inorganic residue, aqueous hydrogen halide from the bottom portion of said treating zone.

19. A process for treating a Friedel-Crafts metal halide sludge formed during the catalytic conversion of hydrocarbons in the presence of a Friedel-Crafts metal halide catalyst which comprises: introducing a stream of said sludge in finely divided form into an upper portion of a treating zone; introducing a stream of steam into said treating zone at a point below the point of introduction of said sludge; countercurrently contacting descending particles of said sludge with said steam and effecting only a partial hydrolysis of the metal halide contained in said sludge to produce hydrogen halide and a partially hydrolyzed sludge; introducing a stream of water in finely divided form into a lower portion of said treating zone at a point below the point of introduction of said steam; intimately contacting descending particles of said partially hydrolyzed sludge with said stream of finely divided water and substantially completing hydrolysis of remaining metal halide in said partially hydrolyzed sludge; withdrawing products of said hydrolysis reactions comprising a mixture of organic residue, inorganic residue, and aqueous hydrogen halide from the bottom portion of said treating zone; withdrawing vaporous products of said hydrolysis reactions overhead from said treating zone; and recovering substantially anhydrous hydrogen halide from said vaporous products.

20. A process according to claim 19 wherein said metal halide is aluminum chloride, said hydrogen halide is hydrogen chloride, said steam is introduced in an amount with the range of 0.05 to 0.25 pound per pound of sludge, and said water is introduced in an amount within the range of 0.25 to 1 pound of water per pound of sludge.

21. A process for treating a Friedel-Crafts metal halide sludge formed during the catalytic conversion of hydrocarbons in the presence of a Friedel-Crafts metal halide catalyst which comprises: introducing a stream of said sludge in finely divided form into an upper portion of a treating zone; introducing a stream of a first hydrolyzing agent selected from the group consisting of steam and finely divided water into said treating zone at a point below the point of introduction of said sludge; contacting descending particles of said sludge with said first hydrolyzing agent and effecting only a partial hydrolysis of the metal halide contained in said sludge to produce hydrogen halide and a partially hydrolyzed sludge; introducing a stream of water in finely divided form into a lower portion of said treating zone at a point below the point of introduction of said first hydrolyzing agent; intimately contacting descending particles of said partially hydrolyzed sludge with said stream of finely divided water and substantially completing hydrolysis of remaining metal halide in said partially hydrolyzed sludge; withdrawing products of said hydrolysis reactions comprising a mixture of organic residue, inorganic residue, and aqueous hydrogen halide from the bottom portion of said treating zone; withdrawing vaporous products of said hydrolysis reactions overhead from said treating zone; and recovering substantially anhydrous hydrogen halide from said vaporous products.

22. A process according to claim 21 wherein said metal halide is aluminum chloride, said hydrogen halide is hydrogen chloride, said first hydrolyzing agent is finely divided water and is introduced in an amount within the range of 0.05 to 0.25 pound per pound of sludge, and said stream of finely divided water introduced into the lower portion of said treating zone is introduced in an amount within the range of 0.25 to 1 pound of water per pound of sludge.

References Cited in the file of this patent

UNITED STATES PATENTS

| | | |
|---|---|---|
| 1,760,962 | Phillips et al. | June 3, 1930 |
| 1,865,797 | Shiffler | July 5, 1932 |
| 1,967,235 | Ferkel | July 24, 1934 |
| 2,351,461 | Smith et al. | June 13, 1944 |
| 2,413,310 | Bloch | Dec. 31, 1946 |
| 2,518,307 | Groebe | Aug. 8, 1950 |
| 2,575,855 | Stengel et al. | Nov. 20, 1951 |
| 2,654,658 | Marshall | Oct. 6, 1953 |

UNITED STATES PATENT OFFICE
CERTIFICATE OF CORRECTION

Patent No. 2,852,582 September 16, 1958

Percy S. Stallings, Jr., et al.

It is hereby certified that error appears in the printed specification of the above numbered patent requiring correction and that the said Letters Patent should read as corrected below.

Column 2, line 20, for "acitvity" read -- activity --; column 8, line 23, for "type of" read -- type is --; column 13, line 3, for "herein" read -- therein --; column 14, line 38, for "adsorbed" read -- absorbed --.

Signed and sealed this 2nd day of June 1959.

(SEAL)
Attest:

KARL H. AXLINE
Attesting Officer

ROBERT C. WATSON
Commissioner of Patents